United States Patent
Baumann

[11] 3,724,813
[45] Apr. 3, 1973

[54] VALVE WITH REMOVABLE SEATING MEANS

[75] Inventor: Hans D. Baumann, Foxboro, Mass.

[73] Assignee: Masoneilan International, Inc., Norwood, Mass.

[22] Filed: May 7, 1971

[21] Appl. No.: 141,204

[52] U.S. Cl. ................................................. 251/360
[51] Int. Cl. ........................................... F16k 51/00
[58] Field of Search ...251/360, 366, 361; 137/454.6, 137/454.2

[56] References Cited

UNITED STATES PATENTS

| | | | |
|---|---|---|---|
| 3,521,666 | 7/1970 | Scaramucci | 137/454.2 |
| 3,298,389 | 1/1967 | Freeman | 137/454.6 |
| 2,846,182 | 8/1958 | Charlton | 251/360 X |
| 3,084,709 | 4/1963 | Flick et al. | 137/454.5 |
| 2,880,748 | 4/1959 | Elsey | 137/454.6 X |
| 2,292,184 | 8/1942 | White et al. | 251/361 |
| 3,335,743 | 8/1967 | McInerney | 251/361 X |
| 3,506,242 | 4/1970 | Aunspach | 251/361 |
| 3,521,667 | 7/1970 | Johnson | 137/454.6 |
| 3,572,631 | 3/1971 | Ritchart | 137/454.6 X |

Primary Examiner—Samuel Scott
Attorney—Chittick, Pfund, Birch, Samuels & Gauthier

[57] ABSTRACT

Control valve with integral bonnet and endwise removable insert providing the valve seat means. Provision for valve plug means larger or smaller than the bonnet opening, and, where larger, for removal of the plug end-wise of the valve body upon withdrawal of the insert.

17 Claims, 10 Drawing Figures

INVENTOR
HANS BAUMANN
BY Chittick, Pfund,
Birch, Samuels + Savitti
ATTORNEYS

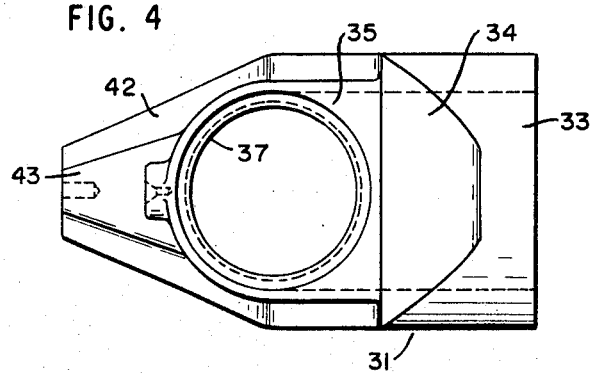
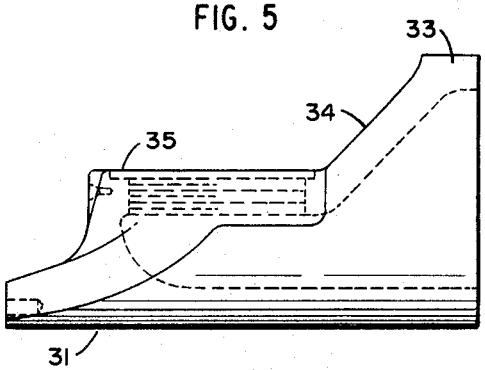
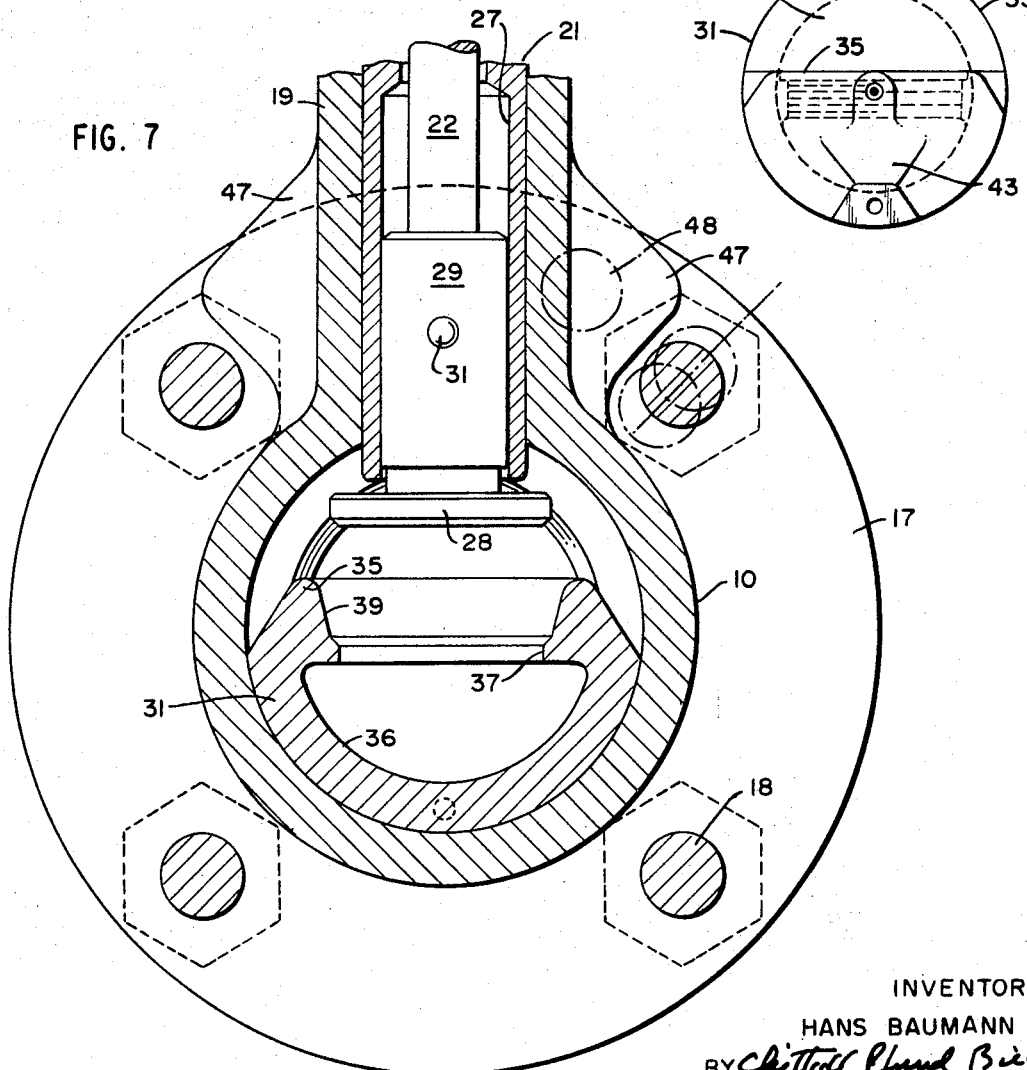
INVENTOR
HANS BAUMANN
ATTORNEYS

FIG. 8
FIG. 9
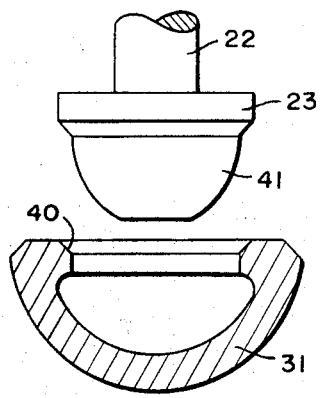
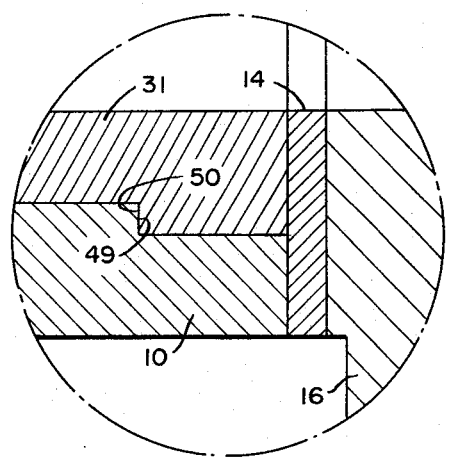
FIG. 10
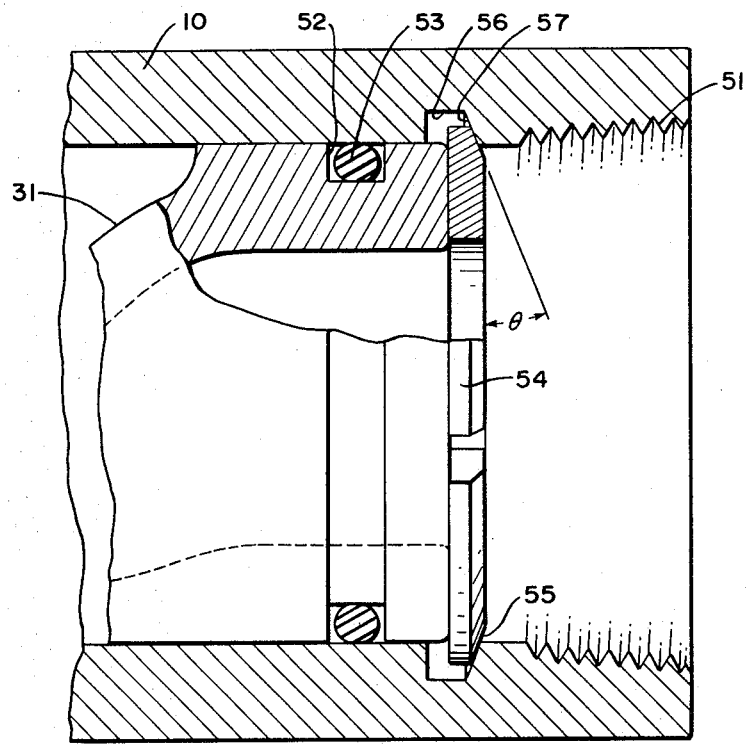
INVENTOR
HANS BAUMANN
BY
ATTORNEYS

VALVE WITH REMOVABLE SEATING MEANS

BACKGROUND OF THE INVENTION

The field of art to which the invention pertains is that of valves for controlling fluid flow, and subject to automatic regulation, in such flow control, by actuator means.

In the state of the prior art known to applicant, referring particularly to Porter U.S. Pat. No. 1,742,319 and Hoke et al. U.S. Pat. No. 2,344,041, the problems to which this invention is directed are left unsolved, and the herein disclosed construction by which applicant's solution is accomplished is not found.

The invention is directed to the increasingly important objectives of cost reduction through simplicity of construction; decreasing material quantity; and cutting down of required machine operations; together with increased reliability and decreased maintenance.

The invention aims more particularly at insertion and removal of inner valve parts without resort to the conventional, bolted or screwed bonnet-to-body construction, which latter introduces, along with the aforementioned and objectionable cost and maintenance factors, additional and costly requirements for effecting close alignment through part-to-part guiding; for assuring tightness in the body-to-bonnet joint; and for retention of necessary design safety factors.

Under this invention, then, in accomplishing the wanted insertion and removal of inner valve parts with provision also of the desired integral bonnet construction, there are achieved: material and machining cost reductions; the introduction of simplicity; greater reliability; decreased maintenance; and the elimination of the above noted and other known objections to or deficiencies of conventional jointed bonnet control valve constructions.

BRIEF SUMMARY OF INVENTION

A tubular valve body with integral bonnet receiving the valve stem and guide. A cylindrical passage in the tubular body, having a shoulder or step at one end. A cylindrical insert providing a valve seat spaced from the body wall, the insert slip-fitted into the passage, and stopped against the shoulder or step, with the valve seat axially centered under the bonnet. Provision for valve plug smaller than, and removable with the guide bushing through, the bonnet opening. Provision alternatively for valve plug larger than the bonnet opening, and removable endwise of the body passage upon withdrawal therefrom of the insert. Provision for sealing the slip-fit joint between the insert and said body.

BRIEF DESCRIPTION OF DRAWINGS

Any person skilled in the art will be enabled to make and use the invention by the following detailed description, taken together with the accompanying drawings illustrating preferred embodiments of the invention, and in which:

FIGS. 4, 5 and 6 are top, side and outlet end views respectively of the insert;

FIG. 7 is a transverse section of a modified form of the invention valve construction;

FIG. 8 shows an integral seat, characterized contour plug form of the invention;

FIG. 9 is a section on the scale of FIG. 2 of a modified construction of the valve portion circled in FIG. 1; and FIG. 10 is a larger scale longitudinal section of a modified form of the cylindrical insert.

DETAILED DESCRIPTION OF THE INVENTION

Figure 1:
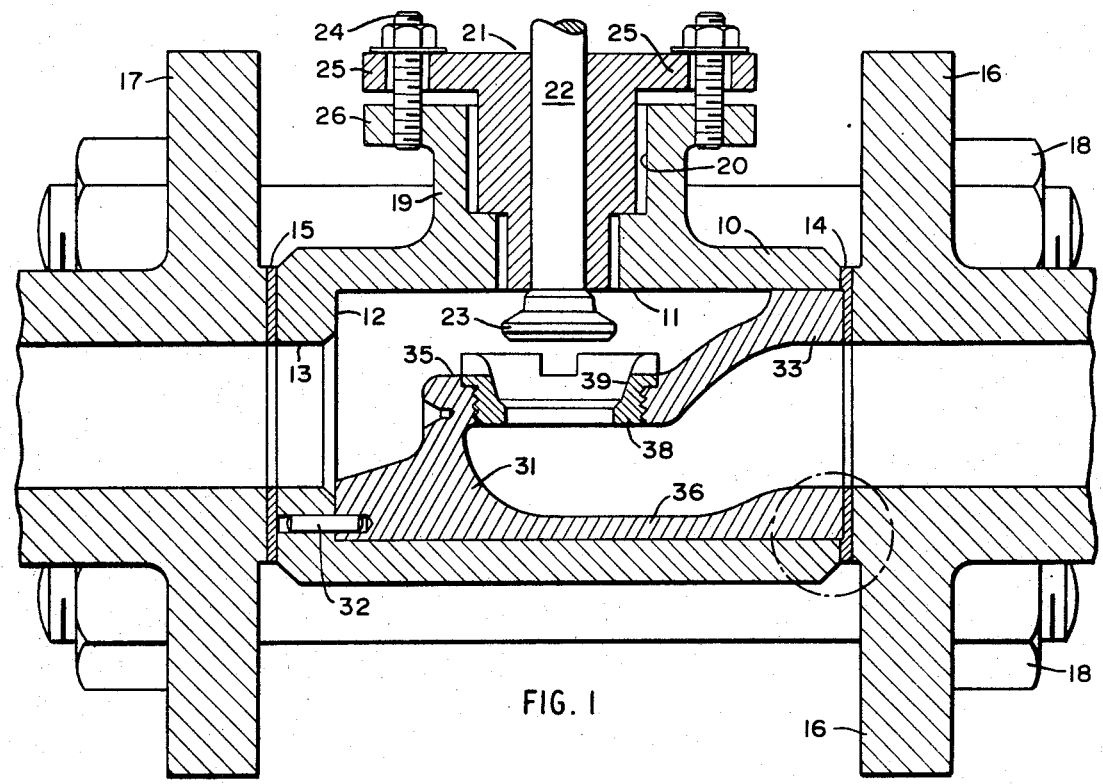
FIG. 1 is a longitudinal section of one form of the invention valve construction.

The invention valve has a tubular body 10, which may be steel, internally recessed or machined from the inlet, herein right hand, end by a straight or uniformly dimensioned, cylindrical passage 11, and which in the FIG. 1 form is internally provided at its outlet end with an obstruction or reduction, herein internal shoulder 12, defining the reduced outlet opening 13.

As shown also in FIG. 7, the tubular body 10 may be formed at its opposite ends for sealing engagement by gaskets or the like 14, 15, as may be clamped thereagainst by line flanges 16, 17 and the usual tie rods or bolt ups 18, FIGS. 1 and 7.

Intermediate its ends the tubular valve body 10 hereof is novelly formed with an integral upstanding neck or bonnet 19 having an annular passage 20 opening into body passage 11.

In the FIG. 1 embodiment a guide bushing 21 is loosely, concentrically received in bonnet passage 20, and slidably receives in turn a valve stem 22, the same terminating within valve body 10 in an integral tapered disk plug 23. Stem 22, it will be understood, is fitted without the bonnet 19 for reciprocating between valve opening and closing positions by actuator means to which the top of the body 10, and/or the bonnet 19, may also be accommodated, which actuator means is external to the invention, known in the art, and therefore not shown.

In all forms of the invention the bushing 21, whose illustration herein is merely schematic or representational, may be variously constructed and arranged for support and sealing of the stem 22. To that end it may be shouldered and clamped against a mating bonnet shoulder as by bolts 24 received through bushing flange 25 and threaded into bonnet flange 26.

In all forms of the invention the bushing 21 may be loose fitting in bonnet passage 20, and have oversized bolt openings, whereby in the clamping up it may be adjusted for proper centering of the valve plug relative to the movable insert mounted valve seat.

In the FIG. 1 embodiment the valve plug 23, being integral with the stem 22, has a dimension equal to or smaller than that of the guide bushing 21 and is therefore removable from the valve body with said bushing through the bonnet passage.

Figure 2:
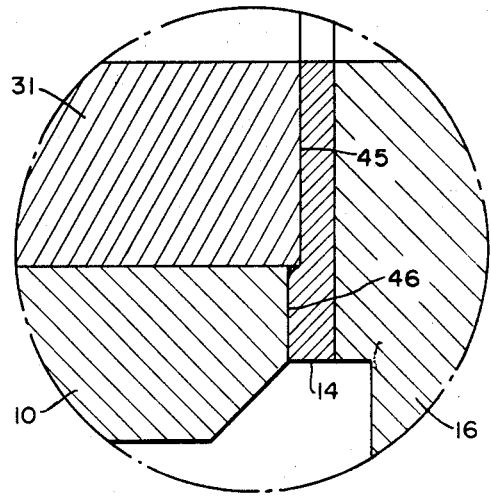
FIG. 2 is an enlargement of the area circled in FIG. 1.

In the FIGS. 2 and 7 embodiments, the bonnet passage 20 receives a bushing 21 recessed, or whose valve stem passage is enlarged, at its lower end to provide a socket 27. A separate disk valve plug 28 depends from a cylindrical bearing hub 29 slidably received in said socket 27 and over the end of valve stem 22.

Within the end of the bushing 21 the stem 22 and hub 29 are removably joined as by slip pin or the like removable fastening means 30 passed transversely through both, and retained therein by enclosure within the wall of tubular body 10 and/or the end of bushing 21, in all positions of opening-closing adjustment of the plug 28.

In accordance with the invention, a straight-cylindrical, generally part-circular valve seat insert 31, which may be cast iron, is slip fitted into valve body 10, and more particularly into its cylindrical passage 11, from the inlet, herein right-hand end thereof. Insert 31 in the FIG. 1 form buts against body or stop shoulder 12, and in all forms is keyed against rotation within the body 10, as in FIG. 1 by pin or the like locator means 32 projecting from stop shoulder 12 and received within a mating insert recess therefor.

Insert 31 is in all forms full-circular or solid cylindrical, at an inlet end portion 33, which also is top-flatted to define a face 34 sloping downwardly to a reduced intermediate portion defining in turn an annular horizontal region or surface 35.

The insert 31 is interiorly contoured from its inlet end by an axial, flow containing and directing passage 36 curving downwardly under sloping face 34 and upwardly under surface 35, thereby defining the insert portion closing over the passage as a bridge wall. Passage 36 terminates in an opening 37 through or aperturing said surface 35 and defining that as an annular valve seat means.

Figure 3:
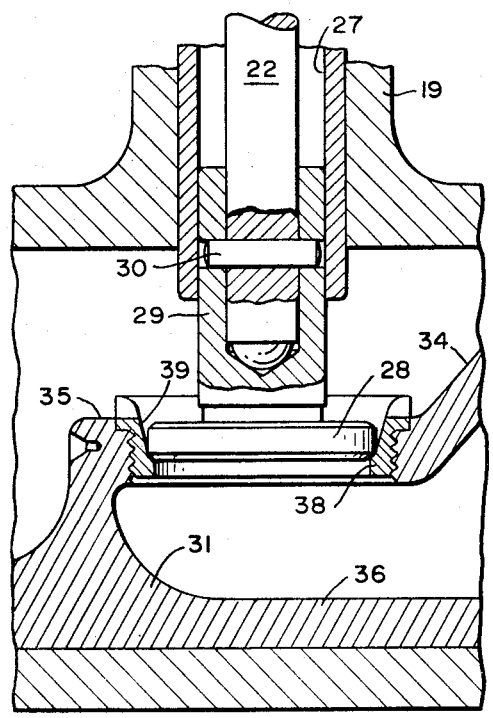
FIG. 3 is a like section, broken away at the ends, of a modified form of the invention valve construction.

Bridge wall opening 37, which may itself be formed as a valve seat, in the FIGS. 1 and 3 embodiments receives a threaded, welded, or otherwise fitted seat ring 38, which may be stainless steel, and which is formed and dimensioned to receive the invention valve plugs, as herein the integral plug 23 and separable plug 28, FIGS. 1, 3 and 7.

In all forms of the invention, the integral seat at bridge wall opening 37, or the alternatively employed ring 38, may be formed with a characterizing contour, such as at 39, whereby, under the invention, and as understood in the art, a determined flow results from a determined control positioning of the valve away from the seat.

Alternatively in all forms of the invention, and as illustrated in FIG. 8, the insert surface 35 or that of the ring 38 therein may define a tapered or champered seat 40, and the valve plug may be formed with the characterizing contour as at 41.

Downstream of its intermediate bridge wall region 35 insert 31 is seen to have a solid, downwardly and inwardly tapered nose portion 42 terminating in a transversely flatted or blunt end 43, the same combining with the aforementioned insert shaping and aperturing to offer efficiency, reduce friction on insertion into and removal from the body, and conserve material.

It will be understood that the insert 31 is lengthwise dimensioned to axially center seat ring 38 under under bonnet 19 when the insert is stopped, as against valve body shoulder 12. Thus, when also the insert is rotationally located as by the pin 30, the seat ring 38, or the opening 37 itself, is, by the described insert positioning, aligned and oriented to seat the valve plug.

Under the invention, the separable valve plug 28, when larger than the bonnet opening 20, is, upon uncoupling the valve body, as by take down of the line flanges 16, 17, removable endwise of the body 10, upon withdrawal first of the insert 31 and seat ring 38 from the body passage 11, as may be accomplished with the FIGS. 3 and 7 valves in the open position. By thereafter depressing the valve plug 28 to below the closed position, or until the pin means 30 is exposed below the body 10 and bushing 21, the plug 28 and hub 29 may be separated from the stem 22 by knockout or removal therefrom of pin 30, the plug 28 being thereby freed for endwise withdrawal from body passage 11 similarly as insert 31.

In use with line flanges 16, 17 insert 31 may be made longer or shorter than body passage 11, by, say, a few thousands of an inch, defining at the inlet end of the valve an annular step or shoulder formation 44, as shown, FIGS. 1 and 2. Accordingly, when the line flanges 16, 17 are locked up the inlet and gasket 14 will be seen to be deformed by the flange compression force and in a way to effect a seal simultaneously on the end faces 45, 46 of the insert and tubular body respectively. As will be understood by those skilled in the art, this prevents unacceptable leakage through the slip-fit body-to-insert joint such as would otherwise let unwanted inlet pressure enter into the low pressure chamber area above the seat ring 38.

Tubular body 10 may additionally be formed, as herein at bonnet 19, FIG. 7, with guide ribs or contoured pads 47 which may project closely between, or may be apertured as at 48 to intermediately receive, the bolting, tie rods, or studs as herein indicated at 19, thereby to assist in valve location and line up at installation by their indicated contacting or accepting a determined number or spacing of the mentioned studs or tie rods 19.

It will be seen that in the FIG. 1 (and also FIG. 8) embodiment the stem 22 and integral plug 23 may be unseated and removed, with guide bushing 21, through the top of the body or bonnet 19, when the actuator is not in place. And the insert 31, machined to slip fit into the cylindrical body passage 11 in the right-to-left direction of flow until, again in FIG. 1, it bears against the outlet end body stop 12, may be so installed or removed when the plug 23 is in the lifted position of FIG. 1, and with the flanges 16, 17 detached.

Similarly, in the FIGS. 3 and 7 embodiments, the insert 27 may be installed or removed when the flanges 16, 17 are not attached, and the valve plug 25 is lifted clear of the seat ring 34.

In FIG. 9, which is a circular section like that of FIG. 2 of the lower portion of the valve body 10, insert 31, and attached flange 16, a modified construction is shown wherein the body passage 11 has at the insert end thereof a step or enlargement 49, and the insert 31 a mating flange or shoulder 50, which step and shoulder may be square or tapered, and provide an insert stop means in lieu of or additional to the internal shoulder 12 of FIG. 1.

In FIG. 10 is shown a modification of the invention valve construction as appropriate for coupling of the valve body 10 to the adjacent upstream and downstream pipe line elements by tapered thread means 51. In the FIG. 10 embodiment the insert 31 has at its cylindrical end portion 33 a recess 52 receiving an oversized "O" or the like resilient, deformable or compressible sealing ring serving to fluid seal the slip fitting of, or annular interface between, valve body 10 and insert member 31.

Further to the FIG. 10 form, the insert 31 thereof is releasably retained in the valve body 10 by an elastic split ring 54 having at its inlet side a tapered or camming face 55 engaging in valve body recess 56 against a matingly inclined face 57, the ring 54 being compressed to pass body passage 11 and enter body recess 56, and therefore expanding in said recess to cam or wedge the insert 31 against its other or outlet end stop means, such as the internal valve body passage shoulder 12.

In the FIG. 10 embodiment, it will be understood, the gaskets 16, 17 are not employed, and the sealing connection of the valve body 10 to the adjacent pipe line parts is accomplished at the threads 51, or otherwise.

From the foregoing it will be understood that under the invention the valve seat may be provided integrally by the insert, or alternatively by a seat ring supported therein. And that, in either arrangement, either the valve seat or the plug face may be formed to a determined characteristic contour so as to provide gradual increase in the curtain area, upon actuator-controlled lifting of the plug from the seat.

Further to the combinations shown to be comprehended by the invention, the valve plugs, or the complementary valve seat, may be either flat tapered or characteristic contoured, and vice versa.

Still further, the invention is shown also to contemplate retention of the insert against either inlet or outlet end shoulder or step formations; and also retention of the same thereagainst either by coupled flanges or by spring ring retainer means, all as herein described.

In all invention forms as well, the insert hereof is shown to be retained against axial as well as rotational cock by the described key means, and the plug is shown to be axially centerable therewith.

And in the flange coupled embodiments, the upset arrangement of the body-insert end faces is shown to accomplish conjointly, through the same gasket means, both a primary seal from pipeline to atmosphere and a secondary seal from insert to body.

I claim:

1. Valve for controlling fluid flow comprising:
   a. a tubular body;
   b. an inlet end formed on said body;
   c. an outlet end formed on said body;
   said inlet and outlet ends adapted to be coupled in a pipe line;
   d. a straight-cylindrical passage formed in said body and extending from the inlet to the outlet end of the body;
   e. an internal stop shoulder formed at the outlet end of said tubular body and reducing said cylindrical passage;
   f. a cylindrical insert removably received in said valve body, said insert having a slip fit in and from the inlet end of said cylindrical passage;
   g. a full-circular, solid-cylindrical insert inlet end;
   h. a part-circular, cylindrical insert body extending from said insert inlet end in cylindrical surface-to-surface engagement with said passage;
   i. a transversely flatted, blunt insert outlet end, said insert outlet end extending to and stopped against said internal body shoulder;
   j. means keying said insert and body against relative rotation;
   k. a lateral bridge wall formed on and intermediate the length of said part-circular insert body, said bridge wall spaced from the opposing wall of said cylindrical body passage;
   l. a vertical opening through said bridge wall;
   m. an axial insert passage,
   said passage conducting fluid flow through said insert from its inlet end to said opening through its said bridge wall;
   n. valve seat means formed at said insert bridge wall;
   o. a bonnet integrally formed on said body;
   p. a valve stem slidable in said bonnet and arranged to be reciprocated by a valve controlling actuator;
   q. bushing means received in said bonnet and surrounding said stem;
   r. a valve plug carried by said stem and for closing against said valve seat means; and
   s. means providing complementary contouring of said valve seat means and valve plug whereby the actuator positioning of said valve stem and plug determines a controlled fluid flow through said bridge wall opening.

2. The valve of claim 1, wherein said keying means comprise a locator pin received in juxtaposed axial recesses in said outlet end and body stop shoulder.

3. The valve of claim 1 wherein the inlet end of said insert has an upstream axial extent different from that of the inlet end of said body, said different axial extent producing an annular shoulder at the inlet end of the valve, and
   valve sealing means engaged against the inlet ends of said body and insert, said sealing means extending across and adapted to be deformed about said shoulder to thereby effectively seal simultaneously both between said valve and the atmosphere and between said body and said insert, and to thereby also prevent unwanted leakage of inlet pressure through said slip fit of said body and insert to the low pressure side of said valve seat means.

4. The valve of claim 1, wherein said plug is not larger than said bushing, and wherein said bushing and therefore said plug are removable through said bonnet.

5. The valve of claim 1, wherein said valve seat means are integrally formed on said insert bridge wall.

6. The valve of claim 1, wherein said valve seat means comprise a seat ring removably supported on said insert bridge wall.

7. The valve of claim 1, wherein said insert is full cylindrical at its inlet end and is exteriorly-upwardly reduced towards its outlet end to space its said bridge wall below said bonnet, and
   a contoured flow passage in said insert directing flow from said inlet end to the underside of said bridge wall.

8. The valve of claim 1, wherein said insert is exteriorly contoured at the outlet side of said bridge wall with a downwardly and inwardly tapered nose portion whereby to offer efficiency, to reduce friction at insertion into and removal from said tubular body, and to conserve material.

9. The valve of claim 1, and guide ribs on said valve body adapted to receive tie rods or the like fastenings passed also through said line flanges, whereby to facilitate valve location and line-up at installation.

10. The valve of claim 1, wherein said bushing is loosely fitting in said bonnet, and is thereby made adjustable in concentricity upon its clamping up to permit a centering adjustment also of said valve plug relative to said valve seat means.

11. The valve of claim 1, wherein the valve seat means has a characterizing contour whereby a determined control positioning of said valve plug away from said valve seat means results in a determined flow through said bridge wall opening.

12. The valve of claim 1, wherein said insert valve seat means has a tapered surface, and wherein said valve plug has a characterizing contour whereby a determined control positioning of said valve plug away from said valve seat means results in a determined flow through said bridge wall opening.

13. The valve of claim 1, and
an annular recess in one of, and
a sealing ring in said recess and proportioned to be compressed by the other of,
said insert and valve body.

14. The valve of claim 1, wherein said plug is larger than said bushing and separable from said stem, and removable with said insert endwise of said body.

15. The valve of claim 14, and pin means removably securing said plug to said stem, said pin means enclosed within said slip bushing or the wall of said tubular body throughout the range of reciprocation of said stem and plug for opening and closing said valve, and said stem and plug depressible to expose said pin means upon the removal from said tubular body of said cylindrical insert.

16. The valve of claim 1, and
a recess in said valve body, and
a split ring engaging the inlet end of said insert and received in said recess.

17. The valve of claim 16, wherein said ring and recess have camming faces at their upstream sides and wherein said ring is expanding into said recess to cam said insert against said stopping means.

* * * * *